3,366,507
TEXTILE COATED WITH ANTISTATIC COMPOSITION
William K. Wilkinson, Waynesboro, Va., assignor to E. I. du Pont de Nemours and Company, Wilmington, Del., a corporation of Delaware
No Drawing. Continuation-in-part of applications Ser. No. 329,245, Dec. 9, 1963; Ser. No. 379,371, June 30, 1964; and Ser. No. 508,854, Nov. 19, 1965. This application Sept. 23, 1966, Ser. No. 581,435
8 Claims. (Cl. 117—138.8)

This is a continuation-in-part of application Ser. No. 329,245, filed Dec. 9, 1963, application Ser. No. 379,371, filed June 30, 1964, and application Ser. No. 508,854, filed Nov. 19, 1965, all now abandoned.

This invention relates to textile treating compositions which are useful as antistatic agents. More particularly, the invention relates to synthetic polymer filaments and protein fibers having a superficial coating of an antistatic composition which is resistant to removal by washing and dry cleaning and which does not discolor the textile material.

The development of static in fabrics, particularly those prepared from synthetic textile fibers, is a well recognized problem. Garments which develop static charges cling to the body of the wearer or to other garments, attract dust and lint, and emit sparks and crackle when handled. A wide variety of materials have been prepared to reduce static development; however, many of these materials provide only temporary protection and are removed by the first laundering or dry cleaning. Most of these materials are water-soluble hygroscopic chemicals since such properties have generally been considered necessary to prevent the development of static charges. These materials include polyhydroxy compounds, polyamines, or salts thereof. More permanent effects have been obtained by using combinations of water-soluble materials such as glycol esters and polyamines, polyethylene glycols and polyamines, and polyepoxides and polyamines or hydroxy amines. However, these materials are not satisfactorily fast to washing. In addition, some discolor the fabric due to the ease of oxidation of the amine component. When ionic groups are included in the materials, these groups tend to attract ions and dispersed matter of opposite charge from water and also absorb dyes or suspended matter from the laundering medium.

It is, therefore, an object of this invention to provide synthetic filaments and protein fibers which have as a surface coating an antistatic composition. It is a more particular object of this invention to provide textile filaments and fibers coated with antistatic compounds which are resistant to removal by washing and dry cleaning, and which do not discolor the textile fiber.

The aforementioned objects as well as other objects are attained by providing textile materials having applied thereto as antistatic compositions water-insoluble addition polymers obtained by polymerizing from about 80 to about 98 weight percent of a phenoxypolyethylene glycol acrylate having the formula

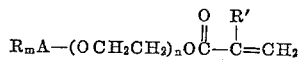

wherein $m$ is an integer from 0 to 5, $n$ is an integer from 4 to 450, R is a member of the group consisting of bromine and an alkyl radical containing from 1 to 20 carbon atoms with the proviso that $m$ is one when R is bromine, A is a phenylene radical, and R' is selected from the group consisting of hydrogen and methyl, with from about 20 to about 2 weight percent of a copolymerizable ethylenically unsaturated monomer containing a radical selected from the group consisting of epoxy groups wherein the oxygen of those groups bridges two adjacent interconnected carbon atoms, and methylol groups. The addition polymers just described have molecular weights in the range from about 10,000 to about 200,000 and are essentially insoluble in water. Those polymers in which the ratio of the number of ethylene oxide groups ($n$) to the sum of carbon atoms in the radicals $R_m$ and A is between 0.5 and 75 provide durable antistatic properties.

In another embodiment of the present invention, an initially water-soluble addition terpolymer may be prepared by copolymerizing the phenoxypolyethylene glycol acrylate and the methylol- or epoxy-containing vinyl monomer with a small amount, i.e., from about 1% to about 4%, of an ethylenically unsaturated acid having from 3 to 12 carbon atoms and which may include sulfur or phosphorus acids. Acids such as acrylic, methacrylic, itaconic, ethylene sulfonic and styrene sulfonic and their salts, when polymerized with the aforementioned materials, yield a terpolymer which is readily dispersible in water. This terpolymer becomes non-dispersible upon cross-linking. As will be described in further detail later herein, cross-linking fixes the polymeric composition on the fiber.

As used herein, the term "epoxy" designates those groups having the formula

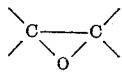

The term "methylol" will be used to designate the monovalent radical HOCH$_2$—. The epoxy-containing vinyl monomers useful in preparing the terpolymers of this invention may be represented by the formula

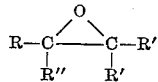

wherein the radical R contains at least one polymerizable vinyl group, R' is selected from the group consisting of hydrogen, alkyl, aryl, and alkylene when both R' substituents are taken together and R" is selected from the group consisting of hydrogen, alkyl and aryl. Examples of suitable epoxide-containing vinyl monomers include: glycidyl methacrylate, glycidyl acrylate, allyl glycidyl ether, butadiene monoepoxide, vinyl 2,3-epoxybutyrate, 4-vinyl-cyclohexene oxide, vinyl 9,10-epoxystearate, 1,2-epoxy-3-(2-allylphenoxy)-propane, allyl 9,10-epoxystearate, allyl - 10,11 - epoxyundecanoate, dicyclopentadiene monoxide, and similar epoxy-containing compounds.

Active methylol groups are provided in the antistatic composition by including as one of the monomers in the interpolymerization reaction a vinyl monomer containing an active methylol group. Among the suitable monomers containing active methylol groups are N-methylolmaleimide, N-methylolacrylamide, N-methylol-N-vinylpiperazine, N-methyol-N-vinyl melamine, N-methylolated acrylo- and methacrylo-guanamine; N-methylolated derivatives of urea, e.g., thiourea and guanidine containing vinyl groups, and alpha-methylolated alkyl vinyl ketones.

It is indeed surprising that the water-insensitive polymers when applied to textile fiibers according to this invention provide excellent antistatic properties. Heretofore it has been generally considered that water-solubility as well as hydroscopicity were necessary in order to provide antistatic properties.

It is essential that the aforementioned limitations be adhered to in order to provide durable antistatic properties. The balance between hydrophobic groups, hydrophilic groups, and cross-linking substituents is critical and must be maintained if a satisfactory washfast composition is to be obtained.

The antistatic compositions are prepared by copolymerizing a phenoxypolyethylene glycol acrylate of the type previously described with one or more of the aforementoined copolymerizable ethylenically unsaturated monomers. Polymerization is carried out in the conventional manner for preparing addition polymers. In a preferred process the monomers are dissolved in a suitable solvent such as N,N-dimethylformamide and heated under a blanket of nitrogen in the presence of a free radical catalyst at temperatures from 50° C. to 100° C. for periods from one to twenty hours. Upon termination of the polymerization reaction, a material such as 2,6-ditertiarybutyl-4-methyl phenol may be added to stop further free radical reactions. The polymer is then either isolated by pouring the polymer-containing solvent solution into ether or water, or the solution may be diluted and applied directly to fibers or a fabric. In carrying out the polymerization, an azo catalyst such as azodiisobutyronitrile is preferred; however, other organic azo compounds such as those disclosed in U.S. 2,471,959 are useful in this process. In addition to N,N-dimethylformamide, other well-known solvents useful in addition polymerization may be used.

The antistatic compositions are easily applied to fibers or fabrics by the usual methods such as dipping, padding, or spraying. Although the preferred products are water-insoluble even before cross-linking, they may be dispersed in water to give colloidal solutions. Or, the polymers may be dissolved and applied, as mentioned, from a solvent-containing solution. In applying the dispersions or solutions to fibers or fabrics, an amount of the polymeric composition is included to provide from about 0.05% to about 5% by weight of the polymer on the fiber. About 1 to 10%, and preferably 4 to 6%, based on the polymer, of a high molecular weight tertiary amine, such as tris(diloweralkylaminoloweralkyl)phenol or dimethylaminopropyl amine may be included for cross-linking and to provide a less tacky finish. Excess solution may be removed from the treated textile material by squeezing; then the material is dried, and heated for a sufficient time at an elevated temperature to effect cross-linking in the polymer. Cross-linking fixes the composition on the fiber rendering it durable to washing and dry cleaning. The time and temperature can be readily selected by those skilled in the art, with temperatures in the range from about 110° C. to 140° C. and heating periods from ten to thirty minutes generally being preferred.

The invention will be further illustrated by the following examples in which parts and percentages are by weight unless otherwise indicated.

EXAMPLE I

This example illustrates a preferred method for preparing the esters of acrylic acid and an alkylphenoxypolyethylene glycol ether.

The following materials are charged in a vessel equipped for removing an azeotrope by distillation:

|   | Parts |
|---|---|
| Toluene | 300 |
| "Igepal" CO-880[1] | 200 |
| Acrylic acid | 20 |
| Sulfuric acid (98%) | 1 |
| Nitrobenzene | 1 |
| Hydroquinone | 0.1 |

[1] "Igepal" is the trade name for Antara Chemical's alkylphenoxy-polyethyleneoxy ethanols. CO-880 is the nonylphenol ether of a polyethylene glycol containing 30 polyethylene oxide units. This "Igepal" and those mentioned later herein are described by Zimmerman and Lavine in "Handbook of Material Trade Names," Supp. III, Industrial Research Service, Inc. (1960).

The nitrobenzene is used to prevent polymerization in the vapor phase, hydroquinone to prevent polymerization in solution.

The mixture is refluxed for sixteen hours with removal of water in the form of an azeotrope. The mixture is then cooled and 20 parts of solid sodium carbonate are added with continued stirring. The mixture is filtered, and the filtrate is evaporated at 60° C. to 80° C. and 10 mm. pressure. The dry monomer which is obtained melts at 50° C. to 60° C. Infrared analysis shows absorption bands at 5.75 microns (ester-carbonyl), 6.26 microns (phenyl end group), and 9.0 microns (ether group). No bands appeared for hydroxyl end groups. The infrared curve for "Igepal" CO-880 shows absorption bands at 2.85 microns (hydroxyl groups), 3.45 microns (—CH groups), 6.2 microns (phenyl groups), and 9.0 microns (ether groups).

EXAMPLE II

In this example an alternate method of preparing the ester of Example I using acrylyl chloride is illustrated.

The following mixture is held at 20° C. for ninety minutes:

|   | Parts |
|---|---|
| Acetone | 119 |
| "Igepal" CO-880 | 110 |
| Triethylamine | 11 |
| Acrylyl chloride (freshly distilled) | 9.3 |

At the end of the reaction time, 0.01 part of 2,6-ditertiarybutyl-4-methyl phenol is added. Then the mixture is filtered to remove the triethylamine hydrochloride using a sintered glass filter. The resulting solution contains from 45% to 50% of the ester. It can be used as prepared or the solvent can be removed by vacuum distillation.

EXAMPLE III

A third method of making the ester monomer is the ester interchange method.

Apparatus employed is: 1-liter, 3-neck, round-bottom flask with heating mantle; 24-inch insulated fractionating column packed with 0.25-inch glass helices; vacuum still heating means; nitrogen capillary; thermometers in pot and in still head, and nitrogen cover. The pot is charged with the following:

|   | Parts |
|---|---|
| "Igepal" CO-880 | 300 |
| Ethyl acrylate (freshly distilled) | 277 |
| 2,6-ditertiarybutyl-4-methyl phenol | 0.6 |
| Ethylenediaminetetraacetic acid (sodium salt) | 0.3 |

The ethyl acrylate and water are distilled until all the water is removed and the head temperature reaches 97° C., after which 3 parts of tetraisopropyl titanate are added and ethanol and ethyl acrylate distilled off, (azeotrope contains 72.7% ethanol), while maintaining head temperature below 85° C. Pot temperature is kept at 104° C. to 110° C. Higher pot temperatures cause yellowing. Progress of the reaction can best be followed by vapor phase chromatography of the distillate. When the distillate contains no ethanol, the catalyst is destroyed by adding 30 parts of 10% sulfuric acid solution. The remaining ethyl acrylate can be removed by adding 300 parts of distilled water and distilling the water and ester azeotropically (azeotrope contains 85% ethyl acrylate). Vacuum is adjusted to keep pot temperature below 110° C.

EXAMPLE IV

This example illustrates the preparation of an antistatic composition for coating filaments in accordance with this invention.

A copolymer of nonylphenoxypolyethylene glycol acrylate and glycidyl methacrylate is made by reacting the following materials under a blanket of nitrogen:

| | | |
|---|---|---|
| "Igepal" CO-880 acrylate | parts | 45 |
| Dimethylformamide | do | 47.2 |
| Glycidyl methacrylate | do | 5 |
| Azodiisobutyronitrile | do | 0.25 |
| Time/temperature | hours at 70° C. | 7 |

The mixture polymerizes to a viscous, pale yellow liquid. When polymerization is substantially complete, about 0.1 part of 2,6-ditertiarybutyl-4-methyl phenol is added as a stabilizer. The conversion is approximately quantitative, and the solution is stable to gelation and to cross-linking for at least three months. This antistatic intermediate is insoluble in water but soluble in acetone.

To 100 parts of distilled water, 0.06 part of tris (dimethylaminomethyl)phenol (DMP) is added and then 2 parts of the above solution of copolymer. Upon light stirring an opalescent dispersion is formed which contains 1% active antistatic material. This solution is used to impregnate a fabric knit from a spun yarn of 4-denier per filament (0.44 Tex) made from a terpolymer of 93.6% acrylonitrile, 6% methyl acrylate, and 0.4% sodium styrenesulfonate. After squeezing out the excess solution, the fabric retains 100% of the solution or 1% of the antistatic composition. The fabric is dried, then heated for fifteen minutes at 130° C. This causes cross-linking through the epoxy groups, and the cross-linked polymer is insoluble in all common solvents such as ketones, alcohols, hydrocarbons, and chlorinated hydrocarbons.

The static propensity of these fabrics is determined by measuring the static charge decay rate using the Vykand Static Propensity Tester, manufactured by the Vykand Corporation. In this equipment the fabric is used to form one plate of a capacitor and the static detector is used as the other plate. A negative charge of 5,000 volts is placed upon the fabric, then the sample is grounded and the time required for leakage to 2,500 volts is measured. This is referred to as the half-life of the static charge. Extreme precautions are necessary to avoid contamination and to maintain constant humidity. Measurements are made at 20% relative humidity (RH).

When tested by this method, the above treated fabric is equal in antistatic properties to an untreated cotton fabric. Other fabrics similarly treated with various amounts of the antistatic composition and tested after a one-hour boil-off and again after twenty complete washes, using a synthetic detergent at 100° F. followed by tumble drying at 160° F., have the ratings shown in Table 1, with cotton and untreated acrylic fiber being used as controls.

TABLE 1.—ANTISTATIC RESULTS ON ACRYLONITRILE TERPOLYMER FABRICS

| Percent Antistatic Comp. | Half-Life of Static Charge (20% RH) | |
| --- | --- | --- |
| | After One Hour Boil-Off (seconds) | After 20 Washes (seconds) |
| 1.3 | 4 | 17 |
| 0.65 | 3 | 55 |
| 0.3 | 3 | 45 |
| 0.0 (Control) | | 5,000+ |
| 0.0 (Cotton) | | 14 to 20 |

Thus 1.3% of this antistatic composition on the acrylonitrile terpolymer fabrics renders them superior to cotton fabrics in static resistance during much of their useful life. Even lower concentrations than shown in Table 1 are adequate. A half-life of not more than 90 seconds is considered satisfactory for most purposes.

Bleaching the fabrics in "Textone" (sodium chlorite) and nitric acid for one hour at 85° C. shows no more than a negligible increase in the half-life value. When the bleached fabrics are dyed with a basic dye ("Sevron" Red B), the antistatic properties are improved.

Improved durability is achieved at even lower levels of application of the antistatic composition if it is applied from non-aqueous systems. For example, the polymers may be prepared in dimethylformamide as shown and in other solvents such as diacetone alcohol, acetone or other ketones boiling below 200° C., and other non-basic agents which will not dissolve the fiber. Dilution prior to application to fabrics or to staple may be accomplished with volatile organic solvents, for example, acetone or other ketones and alcohols boiling below 200° C., such as diacetone alcohol and other polar non-basic agents which will not dissolve the fiber.

The data in Table 2 are obtained using acetone as the diluent for the polymer prepared in dimethylformamide. Curing is accomplished at 130° C. for fifteen minutes.

TABLE 2

| 1.3% Active Antistat On Acrylic Fiber Knit Goods | Half-Life of Static Charge [20% RH] | | | |
| --- | --- | --- | --- | --- |
| | After One Hour Boil-Off (seconds) | After 10 Washes (seconds) | After 20 Washes (seconds) | After 30 Washes (seconds) |
| Applied to white knit goods | 8 | 8 | 8 | 8 |
| Applied to fabric and bleached | 8 | 14 | 24 | 28 |
| Applied to fabric, bleached and dyed | 8 | 8 | 6 | 4 |
| Applied to fabric and dyed | 8 | 6 | 6 | 4 |
| Cotton control (no antistat) | 20 | | | |
| Wool control (no antistat) | Over 1,000 | | | |
| Acrylic fiber control (no antistat) | Over 5,000 | | | |

From the foregoing data it is apparent that bleaching with sodium chlorite and the dyeing with "Sevron" Red GL (basic dye) in the above combinations did not remove the antistat.

The dry-cleaning fastness of this antistatic finish is shown by the following data. The dry-cleaning test consists of ten cleaning cycles of nine minutes each.

TABLE 3

Dry-cleaning system:  Half-life of static charge [20% RH] (seconds)
Perchlorethylene _____ 1
Hydrocarbon solvent _____ 1
Perchlorethylene plus mahogany sulfonate _____ 40
Hydrocarbon plus anionic auxiliary agent _____ 2

Even with the mahogany sulfonate in the dry-cleaning system, this antistatic finish is not completely destroyed or masked.

EXAMPLE V

In this example, N-methylolacrylamide is used as a cross-linking agent. The acrylate ester of Example I and N-methylolacrylamide are copolymerized in the following solution:

Dimethylformamide _____parts__ 47.2
"Igepal" CO-880 acrylate of Example I ___do____ 20.0
N-methylolacrylamide (60% solution in water) parts__ 1.8
Azodiisobutyronitrile _____do____ 0.2
Time/temperature _____hours at 55° C__ 20

The copolymer solution thus prepared is light colored and viscous. The copolymer is soluble in dimethyl formamide, acetone, tetrahydrofuran, and acetonitrile, but insoluble in water. When heated fifteen minutes at 130° C., in the presence of an acidic catalyst such as ammonium chloride, it becomes insoluble in all solvents. Other ratios of N-methylol acrylamide (N–MAA) to the "Igepal" CO–880 acrylate (IC8A) and the durability of the antistatic composition on acrylonitrile polymer fiber are shown in Table 4 in which the amount of N–MAA is expressed as percent of the IC8A:

TABLE 4

| Antistatic Agent (Percent) | N-MAA (Percent) | Application Solvent | Half-Life of Static Charge (20% RH) After 10 Washes (seconds) |
|---|---|---|---|
| 1.0 | 10 | Acetone | 17 |
| 0.5 | 10 | do | 26 |
| 0.1 | 10 | do | 145 |
| 1.0 | 5 | do | 10 |
| 0.5 | 5 | do | 15 |
| 1.0 | 5 | Water dispersion. | 30 |
| Cotton control (no antistat). | | | 20 |
| Acrylonitrile fiber (no antistat). | | | 5,000+ |

The fabrics remained white after the repeated washings and tumble drying at 71° C.

EXAMPLE VI

In this example, a peptizing agent is built into the antistatic composition to improve the dispersibility in water.
A terpolymer is made using the following ingredients:

| | |
|---|---|
| Dimethylformamide | parts 60 |
| "Igepal" CO–880 acrylate of Example I | do 35 |
| Acrylic acid | do 1 |
| Glycidyl methacrylate | do 4 |
| Azodiisobutyronitrile | do 0.4 |
| Time/temperature | hours at 60° C 3 |

At the end of three hours, 0.1 part of 2,6-ditertiarybutyl-4-methyl phenol is added to stop any free radical reactions. A small amount of the terpolymer is isolated by pouring some of the dimethylformamide solution into ether. The data collected from infrared analyses of this terpolymer are compared with data collected from the nonylphenoxypolyethylene glycol, "Igepal" CO–880. These data show the disappearance of the hydroxyl group upon esterification of the nonylphenoxypolyethylene glycol and the appearance of the C=O group, with concurrent appearance of epoxy groups upon copolymerization with glycidyl methacrylate, and the appearance of the COOH group and further increase in the carbonyl ester group. The sum of the phenyl and C=C groups changes only slightly.

The terpolymer of this example is readily dispersible in water and even concentrated formulations (10% to 15% by weight of the polymer) give stable dispersions. Knit fabrics prepared from acrylonitrile terpolymer filaments of the type described in Example IV are impregnated with 1% of the antistatic finish containing 0.06% of DMP, and are then dried and heated twenty minutes at 130° C. to bring about cross-linking. The treated fabrics are then washed through ten complete washing cycles, including tumble drying. Static tests show the treated fabrics to be equal to cotton in static resistivity at 20% RH. The charge on the acrylonitrile terpolymer fabric decreases to half value in ten seconds compared to eighteen seconds for cotton fabrics.

The dry-cleaning fastness is determined by subjecting the fabric samples to ten cleaning cycles of nine minutes each. The following results are obtained:

TABLE 5

| Dry-cleaning system: | Half-life of static charge (20% RH) (seconds) |
|---|---|
| Perchloroethylene | 1 |
| Hydrocarbon solvent | 1 |
| Perchloroethylene plus mahogany sulfonate | 33 |
| Hydrocarbon plus anionic auxiliary agent | 1 |

EXAMPLE VII

The antistatic finish of Example IV is evaluated by application of a 1% solution in acetone containing 0.06% DMP onto the fabric of Example IV. The product is cured at 130° C. for fifteen minutes and evaluated for removal by conventional dry-cleaning agents, e.g., Stoddard Solvent, a hydrocarbon and "Perclene," a chlorinated hydrocarbon.

TABLE 6

| Treatment of fabric: | Half-life of static charge (20% RH) (seconds) |
|---|---|
| 1% Antistat (no treatment) | 3 |
| 1 Hour boil (mock dye) | 3 |
| 5 Dry cleanings in Stoddard Solvent | 27 |
| 5 Dry cleanings in "Perclene" | 35 |
| Cotton control (no treatment) | 24 |
| Wool control (no treatment) | over 300 |

Conventional dry-cleaning agents do not remove appreciable amounts of the antistatic finish, and the synthetic fiber retains its antistatic properties in the range of cotton.

EXAMPLE VIII

This example illustrates applying the antistatic finish to fibers during fiber manufacture. A continuous tow of clean acrylic fibers is passed through a dip-tank containing an aqueous dispersion of the antistatic finish described in Example IV. The excess liquid is removed by squeeze rolls. After cutting, the fiber is dried at 120° C. to 130° C. for fifteen minutes. None of the filaments are glued together so there is no problem in subsequent textile operations such as carding, pin-drafting, or spinning into thread.

In an alternate mode of application, small amounts of a solution of 10% to 20% active ingredient are flowed onto a tow at a rate to provide a coating of 1% to 2% of the finish on the fiber. The antistatic agent of Example VI is dispersed in water to give 10% antistat on an active ingredient basis. As the tow (rope) of fibers passes beneath a slot, the solution is metered onto the top of the tow to provide a 10% weight gain resulting in 1% antistatic coating on the fiber. The coating spreads uniformly throughout the fiber bundle. No stuck filaments are found after curing.

EXAMPLE IX

The antistatic composition of Example VI and 0.3% DMP is dispersed in water to give a 5% dispersion. Various amounts of this dispersion are applied to various synthetic fibers as shown in Table 7:

TABLE 7

| Experiment | Antistatic Coating on Fibers, Percent | Fabrics | Half-Life of Static Charge (sec.) [20% RH] | | |
|---|---|---|---|---|---|
| | | | After 1 Hr. Boil-Off | After 5 Washes | After 10 Washes |
| 1 | None | 66 Nylon | Over 1,000 | | |
| 2 | 1.5 | do | 4 | 27 | 70 |
| 3 | 3.0 | do | 2 | 8 | 50 |
| 4 | None | Wool | Over 1,000 | | |
| 5 | 1.5 | do | 3 | 85 | |
| 6 | 3.0 | do | 2 | 35 | 195 |
| 7 | None | Polyester ("Dacron"¹) | Over 1,000 | | |
| 8 | 1.5 | do | 10 | 300 | |
| 9 | 3.0 | Polyester | 6 | 23 | 57 |
| 10 | None | Polyacrylic ("Orlon"²) | Over 1,000 | | |
| 11 | 1.5 | do | 1 | 12 | 22 |
| 12 | 3.0 | do | 1 | 12 | 20 |

¹ Du Pont's registered trademark for its polyester fiber.
² Du Pont's registered trademark for its acrylic fiber.

These results show that this terpolymer finish is durable on polyamide and polyester fibers. It is also effective on wool, and particularly desirable when applied to polyacrylic fibers.

EXAMPLE X

This example illustrates the preparation of additional esters of acrylic acid and alkylphenoxypolyethylene glycol ethers.

In separate preparations the following materials are substituted in like amounts for the "Igepal" CO-880 and charged to a vessel equipped for removing an azeotrope by distillation as described in Example I.

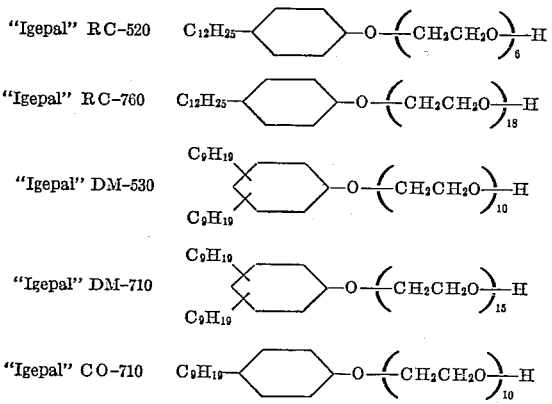

The materials are then reacted with acrylic acid as described in Example I and each of the resulting products reacted with glycidyl methacrylate as described in Example IV.

The final products, when applied from aqueous dispersions to acrylic fibers and cured on the fibers, significantly reduce the static propensity of the fibers.

EXAMPLE XI

This example demonstrates the use of phenols not having an alkyl side chain.

Ethylene oxide gas is reacted with phenol at a temperature of 135–150° C. using sodium as catalyst. Ethylene oxide is added until a product having a molecular weight of 1,773 is formed. This corresponds to a ratio of 38.2 ethylene oxide units per mol of phenol. The excess alkali is neutralized with acetic acid.

The phenoxy ether thus prepared is esterified by direct esterification with acrylic acid as in Example I. This acrylic ester is then copolymerized in the following solution by heating at 60° C. under a nitrogen atmosphere for 2.5 hours: 75.0 parts dimethyl formamide, 44.0 parts phenoxy (PEO)$_{38.2}$ acrylate, 5.0 parts glycidyl methacrylate, and 0.5 part azodiisobutyronitrile. To this solution 2.9 parts of tris(dimethylaminomethyl)phenol (DMP) are added, then a film is cast and heated 0.5 hour at 150° C. to bring about cross-linking through the glycidyl groups. Upon extraction with acetone it is found that 59% of the film is insoluble.

Staple fibers of 3 denier per filament and 2 inch length are prepared from a terpolymer of 93.6% acrylonitrile, 6% methyl acrylate and 0.4% sodium styrenesulfonate. These staple fibers are treated with an emulsion of the copolymer of the phenoxy polyoxyalkylene glycol arcylate and glycidyl methacrylate described above. Two concentrations of the copolymer are used, one containing 1.0% solids and the other 0.5% solids. Each emulsion contains 6.0% DMP based on the copolymer. The staple fiber picks up 100% of the emulsion and after drying, one batch of fiber has 1.0% polymer and the other 0.5% polymer. The dried staple is heated 0.5 hour at 150° C. to cross-link and insolubilize the polymer on the fiber. At the same time another batch of fibers is treated with corresponding amounts of emulsions prepared from a copolymer of nonylphenoxy polyethylene oxide acrylate and glycidyl methacrylate.

The fibers are then spun into 20/1 cc., 11 Z t.p.i. yarns which are knit into fabrics on a Stoll V bed double-knit (14 cut) knitting machine at a setting of 11.5. The double-knit fabrics are scoured at 50° C. in a solution containing 0.2% of a 35% aqueous solution of the sodium salt of a sulfate half-ester of an alkyl polyoxyalkylene glycol in which the alkyl group contains from 16 to 18 carbon atoms. The static properties of these fabrics are tested by the method described in Example IV by measuring the rate at which a static charge is dissipated, using the Vykand Static propensity Tester. The tests are repeated after washing the fabrics three times more.

Another copolymer prepared from a phenoxy polyoxyalkylene glycol acrylate containing 19 mols of ethylene oxide is similarly evaluated. The results of the static decay tests are shown in the following table where the time in seconds is given for a negative charge of 5,000 volts to decrease to 2,500 volts.

| Monomer | Time in Seconds | | | |
|---|---|---|---|---|
| | Scoured | | Scoured and Washed 3 times | |
| | 1% | 0.5% | 1% | 0.5% |
| P(PEO)$_{38.2}$ acrylate | 10 | 11 | 65 | 73 |
| P(PEO)$_{19}$ acrylate | 5 | 8 | 15 | 35 |
| Nonyl P(PEO)$_{37}$ acrylate | 3 | 5 | 10 | 23 |

The results show some advantage for the alkyl phenol and also the desirability of a balance between hydrophobic and hydrophilic groups.

EXAMPLE XII

Following the preparative method of Example II acrylic ester monomers are made from the following nonylphenolpolyoxyethylene glycols:

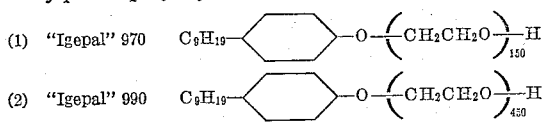

(1) "Igepal" 970   $C_9H_{19}-\langle\rangle-O-(CH_2CH_2O)_{150}-H$ (2) "Igepal" 990   $C_9H_{19}-\langle\rangle-O-(CH_2CH_2O)_{450}-H$ These acrylic ester monomers are separately copolymerized with glycidyl methacrylate as in Example IV and the resulting polymers applied to knit fabrics and to blankets of acrylic fibers. The results are shown in Table 8:

TABLE 8

| Antistat | Percent Antistat on Fabric | Half-Life of Static Charge (at 20% RH), sec. | | |
|---|---|---|---|---|
| | | 1-Hour Dyeing | 5 Mild Washes | 10 Mild Washes |
| "Igepal" CO-880 acrylate/glycidyl methacrylate 90/10. | 2% on knit fabric | 1 | 12 | 23 |
| "Igepal" CO-790 acrylate/glycidyl methacrylate 90/10. | do | 3 | 40 | 80 |
| "Igepal" CO-990 acrylate/glycidyl methacrylate 90/10. | do | 7 | 130 | 130-160 |
| None, acrylic control fabric | | | Over 5,000 | |
| None, wool fabric | | | 400 | |
| None, cotton fabric | | | 18 | |
| "Igepal" CO-880 acrylate/glycidyl methacrylate 90/10. | 2% on blanket fiber | 2 | 2 | 2 |
| "Igepal" CO-970 acrylate/glycidyl methacrylate 90/10. | do | | 5 | 6 |
| "Igepal" CO-990 acrylate/glycidyl methacrylate 90/10. | do | 17 | 17 | 30 |

Although these results show that the very long chain products are inferior in fastness to the shorter-chain products, nevertheless they are effective antistatic agents with fair durability.

EXAMPLE XIII

This example shows the effective range of concentration for one of the preferred antistatic agents of this invention.

The antistatic material of Example IV is applied to acrylic blankets at concentrations of from 0.06% (on the weight of the blanket) to 0.25% using acetone as solvent in one case and water in another case. The results are shown in Table 9:

TABLE 9

| Percent Antistat on Fiber | Solvent Medium | Half-Life of Static Charge at 20% RH, sec. | | | | |
|---|---|---|---|---|---|---|
| | | 1 hour scour at 70° C. | 2 Mild Washes | 4 Mild Washes | 6 Mild Washes | 8 Mild Washes |
| 0.25 | Acetone | 1 | 7 | 20 | 30 | 50 |
| 0.125 | do | 1 | 22 | 30 | 30 | 47 |
| 0.06 | do | 2 | 35 | 55 | 109 | 149 |
| 0.255 | Water | 1 | 20 | 16 | 110 | 50 |
| 0.125 | do | 2 | 65 | 105 | 230 | 300+ |
| 0.06 | do | 3 | 300+ | 300+ | 300+ | 300+ |

Thus, even at 0.06% concentration on the fiber, this antistatic material gives static protection.

EXAMPLE XIV

This example demonstrates the use of a trialkyl phenol in the preparation of an antistat by the process of the present invention. 2,6-ditertiarybutyl-4-methyl phenol is reacted with 40 mols ethylene oxide in an alkaline medium to give an adduct having a molecular weight of about 2,300. The resulting phenoxy glycol ether is esterified with acrylic acid using a 50% excess of acrylic acid in toluene with sulfuric acid as catalyst. Water is removed by azeotrophic distillation as the reaction proceeds. The reaction is considered complete when no more water can be removed. An excess of sodium carbonate is added and the mass stirred for several hours, then filtered and the toluene removed by distillation. Analysis shows that the product has 75% of the theoretical vinyl activity and 93% of the theoretical ester value. The product, 2,6-ditertiarybutyl-4-methylphenoxypolyoxyalkylene glycol acrylate (PPGA), is copolymerized with glycidyl methacrylate in the following solution:

| | |
|---|---|
| PPGA | parts __ 45.0 |
| Dimethylformamide | do ____ 47.2 |
| Glycidyl methacrylate | do ____ 5.0 |
| Azodiisobutyronitrile | do ____ 0.25 |
| Time/temperature | hours at 70° C __ 7 |

An emulsion of the polymer is made by stirring 2 parts of the polymer solution with 98 parts of distilled water containing 0.06 part DMP. The emulsion is applied to staple acrylic fibers as are described in Example XI and the fibers converted to yarn and to fabric. The fabric is found to have a static decay time of 8 seconds after 10 launderings; 16 seconds after 20 launderings and 23 seconds after 30 launderings. Fabrics from untreated fibers are found to have a static decay time in excess of 200 seconds.

EXAMPLE XV

This example is to demonstrate the preparation of the copolymer at a lower concentration in solution.

The monomers of Example XIV are copolymerized in the following solution:

| | Parts |
|---|---|
| PPGA | 22.5 |
| Dimethylformamide | 37.5 |
| Glycidyl methacrylate | 2.5 |
| Azodiisobutyronitrile | 0.25 |

The resulting copolymer is applied to acrylic fabric as in Example XIV and the static decay times are found to be as follows:

| | Seconds |
|---|---|
| After 10 launderings | 21 |
| After 20 launderings | 27 |
| After 30 launderings | 32 |

EXAMPLE XVI

This example is for the purpose of showing the preparation of an anti-stat having bromine attached to the phenolic nucleus.

A phenyl-capped polyethylene oxide:

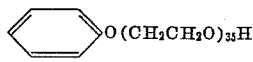

is prepared by reacting phenol with ethylene oxide, using sodium hydride as catalyst. The product of this reaction is found to have a molecular weight of 1600 as determined by titrimetric determination and by weight gain during reaction.

This product (18.7 parts) is dissolved in 159 parts of carbon tetrachloride and 1.9 parts of bromine added with stirring. After stirring for 1 hour, the reaction mass is evaporated on a steam bath to yield a white, waxy solid which gives a positive flame test for halogen.

This brominated phenyl ether is next esterified with acrylic acid to give the following compound:

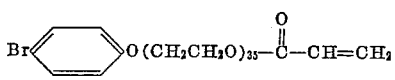

Comparison of the infrared absorptions at about 690 and 760 cm.$^{-1}$ (monosubstitution) with those at about 850 and 950 cm.$^{-1}$ (para disubstitution) using the above ester of a brominated phenyl ether and a comparable ester from a non-brominated ether indicates bromination in the para position as shown. The brominated ester gives a positive halogen flame test while the test of unbrominated ester is negative. An analysis for bromine shows that the brominated ester contains 94% of the theoretical amount of bromine for a monobromo derivative (4.3% bromine compared to a theoretical value of 4.6%). The unbrominated product shows 0.01% bromine by analysis which is within the experimental error for the analytical method.

The brominated and the non-brominated esters are separately copolymerized with glycidyl methacrylate in solution in dimethyl formamide using 11.25 parts of the brominated ester, 1.25 parts glycidyl methacrylate, 0.1 part azodiisobutyronitrile and 18.8 parts of dimethylformamide and heating for 345 minutes at 60° C.

The unbrominated ester is similarly copolymerized.

The two copolymers are separately applied to acrylic fabrics from acetone solution with tris(dimethylaminomethyl)phenol (DMP) as catalyst using 7.5 parts copolymer, 0.18 part DMP and 232 parts acetone. The treated fabrics are heated to 150° C. for 0.5 hour to cross-link the polymers.

Both treated fabrics are found to be anti-static with half decay times of 4 seconds for the brominated and 1 second for the unbrominated. Untreated fabrics tested at the same time and in the same manner show a half decay time of more than 200 seconds.

The tris(dimethylaminomethyl)phenol (DMP) used in the above examples is one of the preferred cross-linking agents and it further aids in the dispersion of the polymer.

In addition to the antistatic compositions described in the foregoing examples, many additional compositions within the scope of the present invention provide antistatic properties when applied to textile fibers. The acrylic acid esters as well as the methacrylic acid esters of methylphenoxy-, dimethylphenoxy-, butylphenoxy-, dibutylphenoxy-, tertiary butylphenoxy-, ditertiary butylphenoxy-, hexylphenoxy-, octylphenoxy-, isooctaphenoxy-, diamylphenoxy-, tertiary hexylphenoxy-, dodecylphenoxy-, and octadecylphenoxy-polyethylene oxide glycols may be polymerized with the glycidyl acrylates, N-methylol acrylamides, and other epoxy and methylol containing vinyl monomers to provide antistatic compositions which may be applied to textile fibers.

As indicated in the foregoing examples, the antistatic compositions of this invention may be applied to both natural as well as synthetic fibers. In addition to those synthetic fibers which have been previously mentioned, those prepared from polyurethanes, polyamides, polyesters, other polyacrylic fibers and protein fibers may be treated with the antistatic compositions of this invention. Those fibers containing at least 85% acrylonitrile in copolymerized form with from 2% to 15% of one or more copolymerizable ethylenically unsaturated monomers are particularly desirable when treated with the compositions of this invention. The copolymerizable monomers are well known in the art and may be of the type mentioned in U.S. Patents 2,436,926 and 2,743,994. In addition, the polymers may contain from about 0.1% to about 10% of a copolymerizable monomer having sulfonic acid or sulfonate salt groups of the type described in U.S. Patent 3,020,265 as well as vinylarene sulfonic acid or sulfonate groups of the type described in U.S Patents 2,837,500 and 2,837,501.

As many widely different embodiments of this invention may be made without departing from its scope, it should be understood that the invention is not to be limited to the specific embodiments.

I claim:

1. As a new article of manufacture, a textile fiber having a superficial coating of an antistatic composition comprising an addition polymer prepared by polymerizing a mixture of from about 2 to about 20 weight percent of an ethylenically unsaturated monomer containing a radical selected from the group consisting of epoxy groups wherein the oxygen of said groups bridges two adjacent interconnected carbon atoms and methylol groups and from about 98 to about 80 weight percent of a copolymerizable ethylenically unsaturated compound having the formula

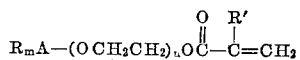

wherein $m$ is an integer from 0 to 5, $n$ is an integer from 4 to 450, R is a member of the group consisting of bromine and an alkyl radical containing from 1 to 20 carbon atoms with the proviso that $m$ is one when R is bromine, A is a phenylene radical, and R' is selected from the group consisting of hydrogen and methyl, said addition polymer having a molecular weight from about 10,000 to about 200,000.

2. The article of claim 1 wherein said fiber is an acrylonitrile polymer filament.

3. The article of claim 2 wherein said coating is present on said fiber in an amount from about 0.05% to about 5% by weight of said fiber.

4. The article of claim 3 wherein said ethylenically unsaturated compound is a nonylphenoxypoly(ethylene oxide) acrylate containing about 37 ethylene oxide groups.

5. As a new article of manufacture, a textile fiber having a superficial coating of an antistatic composition comprising an addition terpolymer prepared by polymerizing a mixture of from about 2 to about 20 weight percent of an ethylenically unsaturated monomer containing a radical selected from the group consisting of epoxy groups wherein the oxygen of said groups bridges two adjacent interconnected carbon atoms and methylol groups, from about 98 to about 80 weight percent of a copolymerizable ethylenically unsaturated compound having the formula

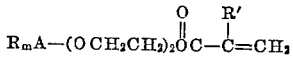

wherein $m$ is an integer from 0 to 5, $n$ is an integer from 4 to 450, R is a member of the group consisting of bromine and an alkyl radical containing from 1 to 20 carbon atoms with the proviso that $m$ is one when R is bromine, A is a phenylene radical, and R' is selected from the group consisting of hydrogen and methyl, and from about 1 to about 4 weight percent of a copolymerizable ethylenically unsaturated acid containing from 3 to 12 carbon atoms, said terpolymer having a molecular weight from about 10,000 to about 200,000.

6. The article of claim 5 wherein said fiber is an acrylonitrile polymer filament.

7. The article of claim 6 wherein said coating is present on said fiber in an amount from about 0.05% to about 5% by weight of said fiber.

8. The article of claim 7 wherein said ethylenically unsaturated compound is a nonylphenoxypoly(ethylene oxide) acrylate containing about 37 ethylene oxide groups.

References Cited

UNITED STATES PATENTS

| | | | |
|---|---|---|---|
| 2,839,430 | 6/1958 | Rimmer | 117—139.5 |
| 2,839,431 | 6/1958 | Rimmer | 117—139.5 |
| 3,090,704 | 5/1963 | Collins et al. | 117—139.5 |
| 3,213,053 | 10/1965 | Kendrick | 117—139.5 |
| 3,242,123 | 3/1966 | Mayfield et al. | 117—139.5 |

WILLIAM D. MARTIN, *Primary Examiner.*

T. G. DAVIS, *Assistant Examiner.*